UNITED STATES PATENT OFFICE 2,150,793

DYESTUFFS OF THE ANTHRAQUINONE SERIES

Werner Zerweck, Ernst Heinrich, and Otto Trösken, Frankfort-on-the-Main-Fechenheim, Germany, assignors to General Aniline Works, Inc., New York, N. Y., a corporation of Delaware No Drawing. Application March 4, 1938, Serial No. 193,916. In Germany March 5, 1937

3 Claims. (Cl. 260—372)

Our present invention relates to dyestuffs of the anthraquinone series, more particularly to those of the general formula:

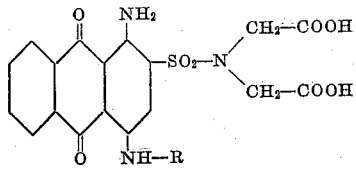

wherein R stands for a member selected from the group consisting of alkyl, cycloalkyl and aryl, aryl meaning a radicle of the benzene series.

The new dyestuffs may be prepared for instance by condensing 1-amino-4-halogenanthraquinone-2-sulfonic acid chloride with imino-diacetic acid (or with amino-acetic acid or $NH_3$, followed by after treatment with chloroacetic acid) and replacing the halogen atom in the 4-position of the condensation product formed by the radicle of a suitable amine.

It is surprising that the new dyestuffs possess the properties of acid wool dyestuffs and that they have a solubility in water sufficient for such dyestuffs, in spite of the absence of sulfo groups in the molecule. They are distinguished by a surprisingly good levelling power which is better than that of the corresponding known dyestuffs containing a sulfo group instead of the group:

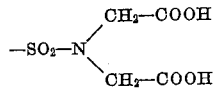

In order to further illustrate our invention the following examples are given, the parts being by weight and all temperatures in degrees centigrade, but we wish it, however, to be understood that our invention is not limited to the examples given nor to the exact conditions stated therein.

Example 1

100 parts of 1-amino-4-bromoanthraquinone-2-sulfonic acid chloride are dissolved in a mixture of about 850 parts of dioxane and 150 parts of alcohol. Then the solution of the sodium salt of 60 parts of iminodiacetic acid in 150 parts of water is added and the mixture is stirred at room temperature for some hours, until a test gives a clear solution in water. The dioxane and the alcohol are removed by distillation with steam, the aqueous solution is filtered and the sulfoneamide formed of the formula:

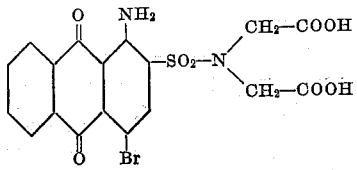

is precipitated by the addition of sodium chloride and purified by recrystallization from water.

10 parts of this sulfoneamide compound are dissolved in about 1000 parts of water, then 12 parts of aniline, 5 parts of sodium bicarbonate and 1 part of copper sulfate are added and the mixture is heated to about 80–90° for some hours. When the formation of the dyestuff is complete, the solution is filtered and the dyestuff formed of the formula:

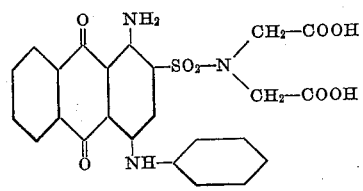

is precipitated by the addition of sodium chloride, filtered off and dried. It dissolves in concentrated sulfuric acid with a green color and dyes wool and acetate artificial silk clear blue shades of very good levelling power and good fastness properties.

By employing instead of aniline in the above example the corresponding amount of 4-acetyl-amino-1-aminobenzene a dyestuff is obtained of the formula:

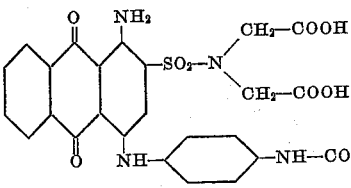

which dyes wool clear greenish blue shades of good levelling power and good fastness properties.

The analogous dyestuff which contains the acetylamino group in the 3-position of the benzene nucleus yields on wool reddish blue shades of similar good properties.

*Example 2*

10 parts of the sulfoneamide compound prepared according to the first paragraph of Example 1 are dissolved in about 900 parts of water. Then 100 parts of alcohol, 30 parts of hexahydroaniline, 12 parts of sodium carbonate and 1 part of copper sulfate are added and the mixture is heated to boiling for some hours in an apparatus provided with a reflux condenser. When the formation of the dyestuff is complete, the alcohol and the excess of hexahydroaniline are removed by distillation with steam, the aqueous solution is filtered and the dyestuff formed of the formula:

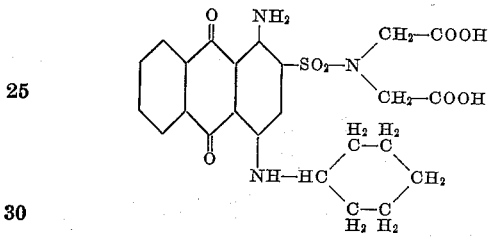

is precipitated by the addition of sodium chloride, filtered off and dried. It dissolves in concentrated sulfuric acid with a yellowish-brown color which is turned to blue by the addition of paraformaldehyde. The dyestuff dyes wool reddish blue shades of good fastness properties.

By replacing hexahydroaniline by the corresponding amount of isopropylamine or sec.-butylamine similar dyestuffs are obtained which yield on wool likewise reddish blue shades of good levelling power and good fastness properties.

We claim:

1. The dyestuffs of the anthraquinone series of the formula:

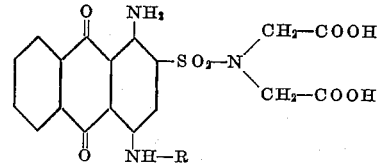

wherein R stands for a member selected from the group consisting of alkyl, cycloalkyl and aryl, aryl meaning a radicle of the benzene series, which dyestuffs yield on wool blue to green shades of good levelling power and good fastness properties.

2. The dyestuff of the anthraquinone series of the formula:

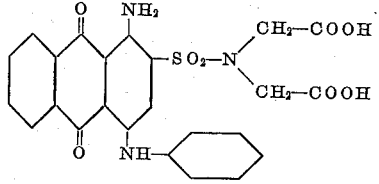

which dyestuff dyes wool and acetate artificial silk clear blue shades of very good levelling power and good fastness properties.

3. The dyestuff of the anthraquinone series of the formula:

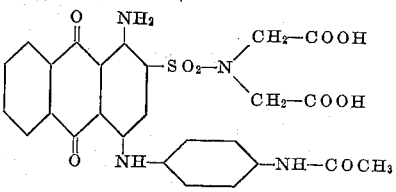

which dyestuff dyes wool clear greenish blue shades of good levelling power and good fastness properties.

WERNER ZERWECK.
ERNST HEINRICH.
OTTO TRÖSKEN.